United States Patent
Maclean et al.

(10) Patent No.: US 7,177,418 B2
(45) Date of Patent: Feb. 13, 2007

(54) POWER EFFICIENT ADSL CENTRAL OFFICE DOWNSTREAM CLASS G POWER SWITCH

(75) Inventors: Kenneth George Maclean, Dallas, TX (US); Marco Corsi, Parker, TX (US)

(73) Assignee: Texas Instruments Incorporated, Dallas, TX (US)

( * ) Notice: Subject to any disclaimer, the term of this patent is extended or adjusted under 35 U.S.C. 154(b) by 907 days.

(21) Appl. No.: 10/200,459

(22) Filed: Jul. 22, 2002

(65) Prior Publication Data

US 2004/0013263 A1    Jan. 22, 2004

(51) Int. Cl.
*H04M 1/00* (2006.01)
*H04M 3/00* (2006.01)

(52) U.S. Cl. .................. 379/395.01; 330/297

(58) Field of Classification Search ........... 379/413, 379/322–324, 395.01; 330/297
See application file for complete search history.

(56) References Cited

U.S. PATENT DOCUMENTS

| | | | |
|---|---|---|---|
| 5,825,218 A * | 10/1998 | Colli et al. ............. | 327/112 |
| 5,898,342 A | 4/1999 | Bell | |
| 5,973,552 A * | 10/1999 | Allan ..................... | 327/544 |
| RE37,291 E * | 7/2001 | Botti et al. ............. | 330/51 |
| 6,281,747 B2 | 8/2001 | Ahuja et al. | |
| 6,621,350 B2 * | 9/2003 | Verbist et al. ......... | 330/297 |

* cited by examiner

*Primary Examiner*—Curtis Kuntz
*Assistant Examiner*—Alexander Jamal
(74) *Attorney, Agent, or Firm*—Dolly Y. Wu; W. James Brady, III; Frederick J. Telecky, Jr.

(57) ABSTRACT

Systems and methods are provided for switching between power supply rail voltages for a differential driver device of a class G amplifier device. The amplifier device employs power MOSFETs to switch between supplying high supply voltages and low supply voltages to the power rails of the differential driver. The class G amplifier can be employed in driving an ADSL signal over a telephone line. A control device ramps the power supply rail voltage between low power supply states and high power supply states to mitigate noise and spikes that can be coupled to the output signal.

24 Claims, 8 Drawing Sheets

POWER EFFICIENT ADSL CENTRAL OFFICE DOWNSTREAM CLASS G POWER SWITCH

TECHNICAL FIELD

The present invention relates to communications and more particularly to an Asymmetric Digital Subscriber Line (ADSL) central office power switch.

BACKGROUND OF INVENTION

ADSL is a modem technology that converts existing telephone lines into access paths for multimedia and high speed data communications. ADSL utilizes advanced digital signal processing and creative algorithms to squeeze greater amounts of information through twisted-pair telephone lines than was conventionally feasible. The ADSL standard calls for a specifically designed modem at each end of a twisted pair copper line, one at a home and the other at a central office of the phone company. Although the conventional telephone voice circuit has only a 4 KHZ bandwidth, the physical wire connection bandwidth is more than 1 MHZ.

ADSL exploits the extra bandwidth to send data to the central office where it can connect to a phone company's high capacity fiber optic network. ADSL modems increase the amount of information that conventional phone lines can carry buy using discrete multi-tone technology (DMT). DMT divides the bandwidth into independent subbands, then transmits data on all of the subbands simultaneously. Echo cancellation techniques allow upstream and downstream data to overlap. The standard also reserves a 4 KHZ region at the DC end of the frequency band for POTS (i.e., Plain Old Telephone System). ADSL is particularly attractive for consumer Internet applications where most of the data traffic is downloaded to the customer. Upstream bandwidth for uploading data can be reduced to increase downstream bandwidth since most Internet traffic is downstream.

Terminals employed at the central office typically communicate over several channels. These terminals employ modems or other communication devices for data transmissions. These modems or other communication devices can employ a digital processor, a coder/decoder component, line drivers and other peripheral devices to support transmitting and receiving of analog signal transmissions. The central office line driver drives the ADSL signal onto telephone lines. The ADSL signal includes data streams that are carried over tones that are amplitude, phase modulated and frequency separate by 4 KHZ. Generally, the tones are limited in amplitude, for example, to 3.162 VRMS with a average peak value of +/−4.47 volts. Occasionally, the amplitudes of the ADSL signal line up to generate a large peak voltage that can be 5 to 7 times larger than the RMS value. Therefore, the line driver needs to support a voltage swing that encompasses the high peak-to-average ratio. Using a standard class AB amplifier would be inefficient due to the large power supply voltages (e.g., +/−15 volt supply) needed to provide the large voltage swing to support the occasional large peak voltages. Therefore, a class G amplifier is employed that switches between high and low supply rails as the amplitude transitions between the large peak signal and the general RMS value signal.

Figure 1:
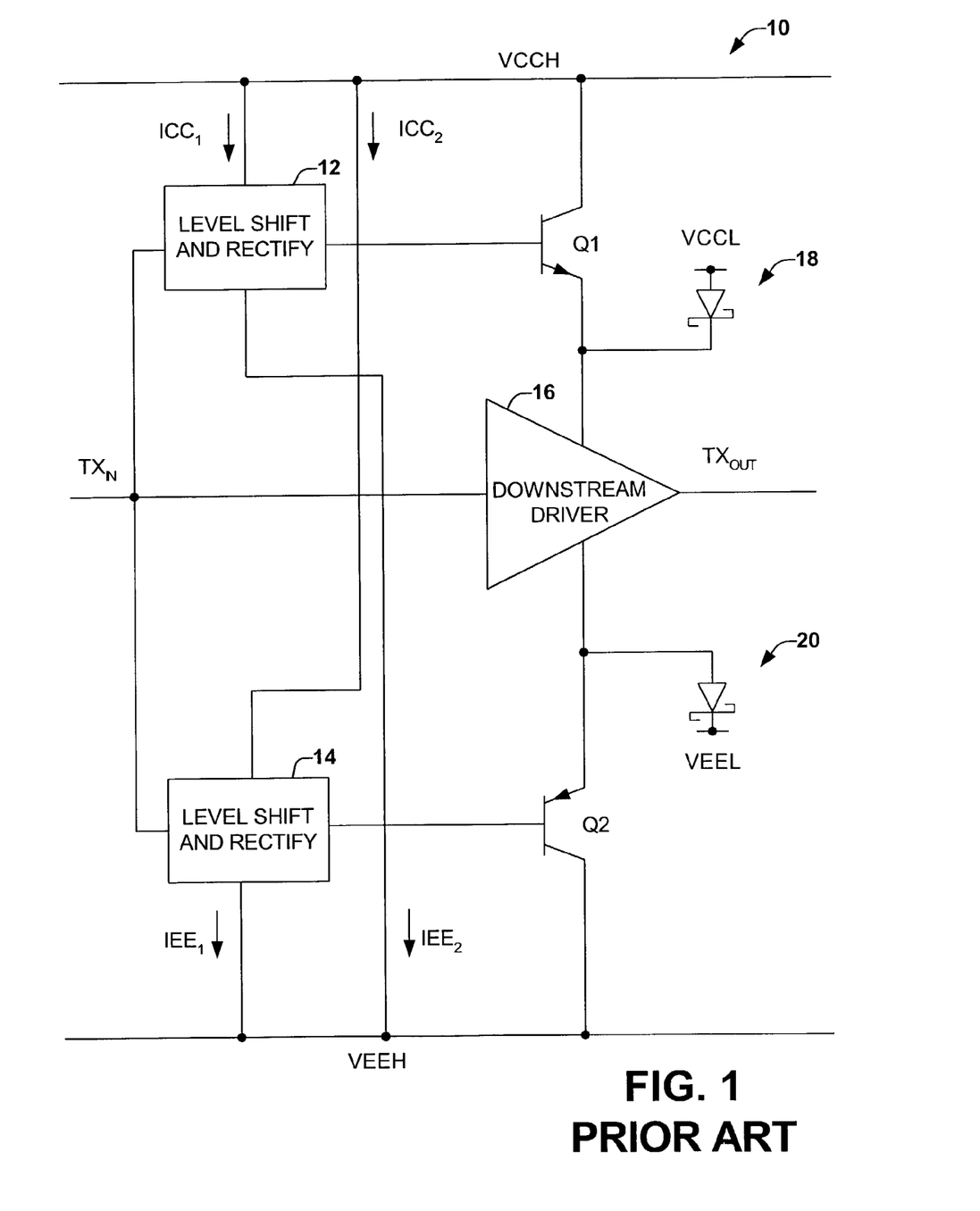
FIG. 1 illustrates a schematic block diagram of a prior art class G linear BJT amplifier.

FIG. 1 illustrates a conventional class G linear BJT amplifier 10 with class G output transistors Q1 and Q2 connected common collector. The amplifier 10 includes a positive side level shifter 12 and a negative side level shifter 14. The positive side level shifter 12 and the negative side level shifter 14 detect transitions of an ADSL input signal $TX_{IN}$ between a general RMS amplitude level and a high spike peak voltage. The amplifier 10 includes a positive side NPN BJT transistor Q1 and a negative side PNP BJT transistor Q2 enabled by the positive side level shifter 12 and the negative side level shifter 14, respectively, upon detection of a high spike peak voltage on the ADSL input signal $TX_{IN}$. A positive side zener diode 18 is coupled to the positive side power rail of the downstream driver 16, and a negative side zener diode 20 is coupled to the negative side power rail of the downstream driver 16.

If the input signal has a general RMS amplitude level, the positive side power rail of the differential driver 16 is supplied with a low power supply voltage VCCL through the positive side zener diode 18, and the negative side power rail of the differential driver 16 is supplied with a low power supply voltage VEEL through the negative side zener diode 20. If the level shifter 12 and the level shifter 14 detect a high spike peak voltage amplitude level in the ADSL input signal $TX_{IN}$, the level shifters 12 and 14 turn on the transistors Q1 and Q2, respectively. The positive side power rail of the differential driver 16 is supplied with a high power supply voltage VCCH through the positive side transistor Q1, and the negative side power rail of the differential driver 16 is supplied with a high power supply voltage VEEH through the negative side transistor Q2. The linear amplifier 10 drives the collectors of the downstream signal output drive transistors with a level shifted and half wave rectified version of the output signal.

The linear BJT amplifier 10 requires a large power supply overhead voltage to keep the class G output BJTs Q1 and Q2 from saturating. This voltage is typically about 2.5 volts at maximum downstream signal power. This is inefficient because the full load current at peak is passed through the output transistors Q1 and Q2 giving a power loss of $2.5 \ast I_{PEAK}$. If the output transistors saturates, the transistor current gain is reduced and additional input current is required to maintain the same output current. Therefore, the supply voltages need to be about 2.5 volts higher than the rail voltages supplied to the differential driver 16 for a given output signal. Additional losses occur due to the level shifters 12 and 14, since the level shifters 12 and 14 remain on at all times to detect the transitions of the ADSL input signal $TX_{IN}$ between the general RMS amplitude level and the high spike peak voltage. As illustrated in FIG. 1, currents $ICC_1$, $ICC_2$, $IEE_1$, and $IEE_2$ are supplied by the power supplies to the level shifters at all times, so that transitions between amplitude levels can be detected.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods for switching between power supply rail voltages for a differential driver device of a class G amplifier device. The amplifier device employs power MOSFETs to switch between supplying high supply voltages and low supply voltages to the power rails of the differential driver. The class G amplifier can be employed in driving an ADSL signal over a telephone line. A control device ramps the power supply rail voltage between low power supply states and high power supply states to mitigate noise and spikes that can be coupled to the output signal. The control device receives a switch signal that indicates whether the ADSL signal has a general RMS voltage amplitude level or a high spike voltage amplitude level. The determination can be made by a DSP or other device that provides the ADSL input signal.

The control device monitors the change in the switch control signal, and ramps the output supply voltage from a high supply voltage to a low supply voltage, or a low supply voltage to a high supply voltage. Once the output supply voltage reaches a desired supply level, the MOSFET devices are held in a steady state condition and the control circuitry enters a suspend or low current state. Switching of the control signal wakes up the control device, which repeats the ramping of the supply voltage to the new desired level. A positive side power rail and a negative side power rail of the differential driver are switched between high supply voltages and low supply voltages concurrently.

In one aspect of the invention, the control device includes an integrating device comprised of an operational amplifier and a feedback capacitor. A first input (e.g., non-inverting input) of the operational amplifier is coupled to a bidirectional current source. A second input (e.g., inverting input) of the operational amplifier is coupled to a low power supply voltage. The feedback capacitor is coupled between the supply output voltage to a supply rail of a differential driver, and the first input of the operational amplifier. The supply output voltage is coupled to a node between a power MOSFET pair coupled between a high supply voltage and a low supply voltage. A switch control signal determines whether a first current source or a second current source is selected. The first current source cooperates with the feedback capacitor to ramp the output voltage from a low supply voltage to a high supply voltage. The second current source cooperates with the feedback capacitor to ramp the output voltage from a high supply voltage to a low supply voltage. The ramp rate is determined by the values of the feedback capacitor and the selected current source.

The gates of the MOSFET devices of the power MOSFET pair are measured to determine when the supply output voltage reaches the desired supply voltage level. Once the supply output voltage level reaches the desired supply voltage level, the operational amplifier and the bidirectional current source are powered down. The control device switches both the positive rail and negative rail of the differential driver concurrently.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to a class G amplifier that employs MOSFETs as class G output transistors in common source. In steady state, the gates of the output transistors can be driven to the power supplies, this amount of overdrive, together with the size of the MOSFETs allows a headroom voltage between about 100 mv to about 200 mv to be achieved, representing a significant improvement in efficiency as compared to the conventional BJT implementation of FIG. 1. In steady state, the MOSFETs require no gate current facilitating an additional improvement in efficiency. Additionally, the class G amplifier in accordance with the present invention, can power up when necessary, switch power supplies in a controlled manner to mitigate fast output voltage transitions, ringing or spiking that can be coupled onto the downstream signal causing distortion and reducing the data rate, and switch itself off when switching has been completed reducing power consumption.

Figure 2:
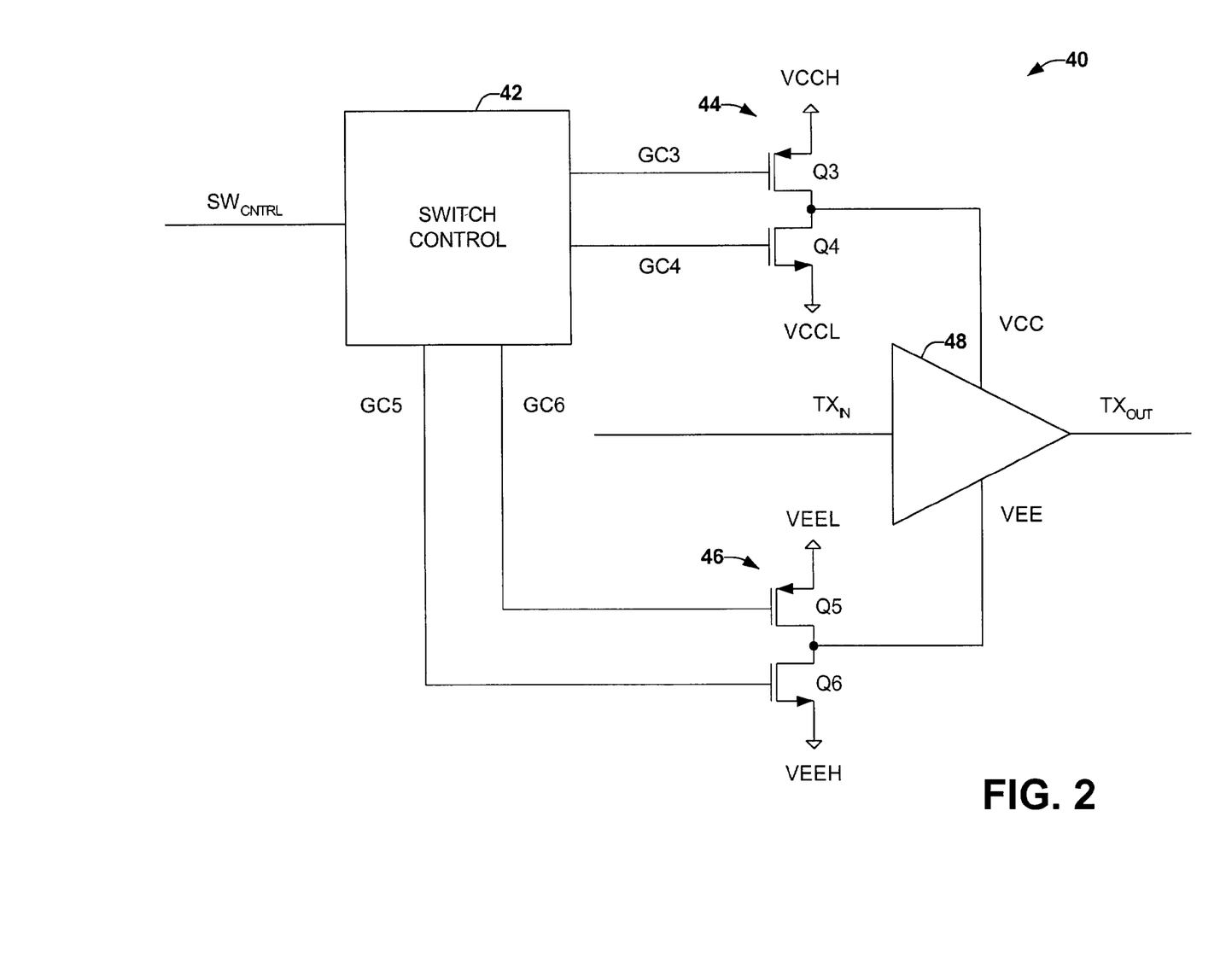
FIG. 2 illustrates a schematic block diagram of a class G amplifier in accordance with an aspect of the present invention.

FIG. 2 illustrates a schematic block diagram of a class G amplifier 40 in accordance with an aspect of the present invention. The class G amplifier can be employed as an ADSL downstream driver that has data that swings between high and low voltage amplitude levels. The amplifier 40 includes a positive side MOSFET pair 44 coupled to a positive side power rail of a differential driver 48, and a negative side MOSFET pair 46 coupled to a negative side power rail of the differential driver 48. The positive side MOSFET pair 44 includes a p-type MOSFET device Q3 and an n-type MOSFET device Q4 coupled common drain. The p-type MOSFET device Q3 has its source coupled to a high voltage power supply VCCH and the n-type MOSFET device Q4 has its source coupled to a low voltage power supply VCCL. The negative side MOSFET pair 46 also includes a p-type MOSFET device Q5 and an n-type MOSFET device Q6 coupled common drain. The p-type MOSFET device Q5 has its source coupled to a low voltage power supply VEEL (e.g., low negative voltage value) and the n-type MOSFET device Q6 has its source coupled to a high voltage power supply VEEH (e.g., high negative voltage value).

For example, the supply voltages VCCH and VCCL can have positive voltage values, and the supply voltages VEEH and VEEL can have negative voltage values. In this disclosure VCCL and VCCH are assumed to both be positive voltages, whilst VEEL and VEEH are assumed to be negative voltages. However this is not essential, all supplies may be positive, negative, or any combination of positive and negative as long as VCCH is more positive than VCCL, VCCL is more positive than VEEL and VEEL is more positive than VEEH. A switch control device 42 switches the MOSFET devices between providing high supply voltages VCCH and VEEH at the positive side power rail, and the negative side power rail, respectively, of the differential driver 48, and low supply voltages VCCL and VEEL at the positive side power rail and the negative side power rail, respectively, of the differential driver 48.

The switch control device 42 receives a switch control signal $SW_{CNTRL}$, for example, from a DSP. The switch control signal $SW_{CNTRL}$ informs the switch control device 42 that the ADSL input signal is transitioning between a general RMS voltage amplitude level and a high spike peak voltage amplitude level. The switch control device 42 then selects the appropriate MOSFET devices to turn "ON" via gate control signals GC3, GC4, GC5 and GC6. The MOSFET devices switch the appropriate power supply voltages to the positive side power rail (VCC) and negative side power rail (VEE) of the downstream differential driver 48 to accommodate the voltage swing of the input signal $TX_{IN}$. If the input signal has a general RMS amplitude level, the positive side power rail (VCC) of the differential driver 48 is supplied with the low power supply voltage VCCL by turning the p-type MOSFET device Q3 to an "OFF" state, and turning the n-type MOSFET device Q4 to an "ON" state. The negative side power rail (VEE) of the differential driver 48 is supplied with the low power supply voltage VEEL by turning the p-type MOSFET device Q5 to an "ON" state, and turning the n-type MOSFET device Q6 to an "OFF" state.

If a high spike peak voltage amplitude level is detected, a switch control signal transition is provided to the switch control device 42. The switch control device 42 detects a change in state of the control signal ($SW_{CNTRL}$), and switches the states of the MOSFET devices Q3–Q6 such that the MOSFET transistors provide high supply voltages VCCH at the positive side power rail (VCC) and VEEH at the negative side power rail (VEE) of the differential driver 48. Specifically, the p-type MOSFET device Q3 is turned to an "ON" state, the n-type MOSFET device Q4 is turned to an "OFF" state, the p-type MOSFET device Q5 is turned to an "OFF" state, and the n-type MOSFET device Q6 is turned to an "ON" state. The switch control device 42 can receive a change in state of the control signal ($SW_{CNTRL}$), which initiates a transition change of the MOSFET devices Q3–Q6. Between transitions during a steady state condition, the switch control device 42 can hold the states of the MOSFET devices Q3–Q6, power down and enter a sleep mode to mitigate power consumption.

Figure 3:
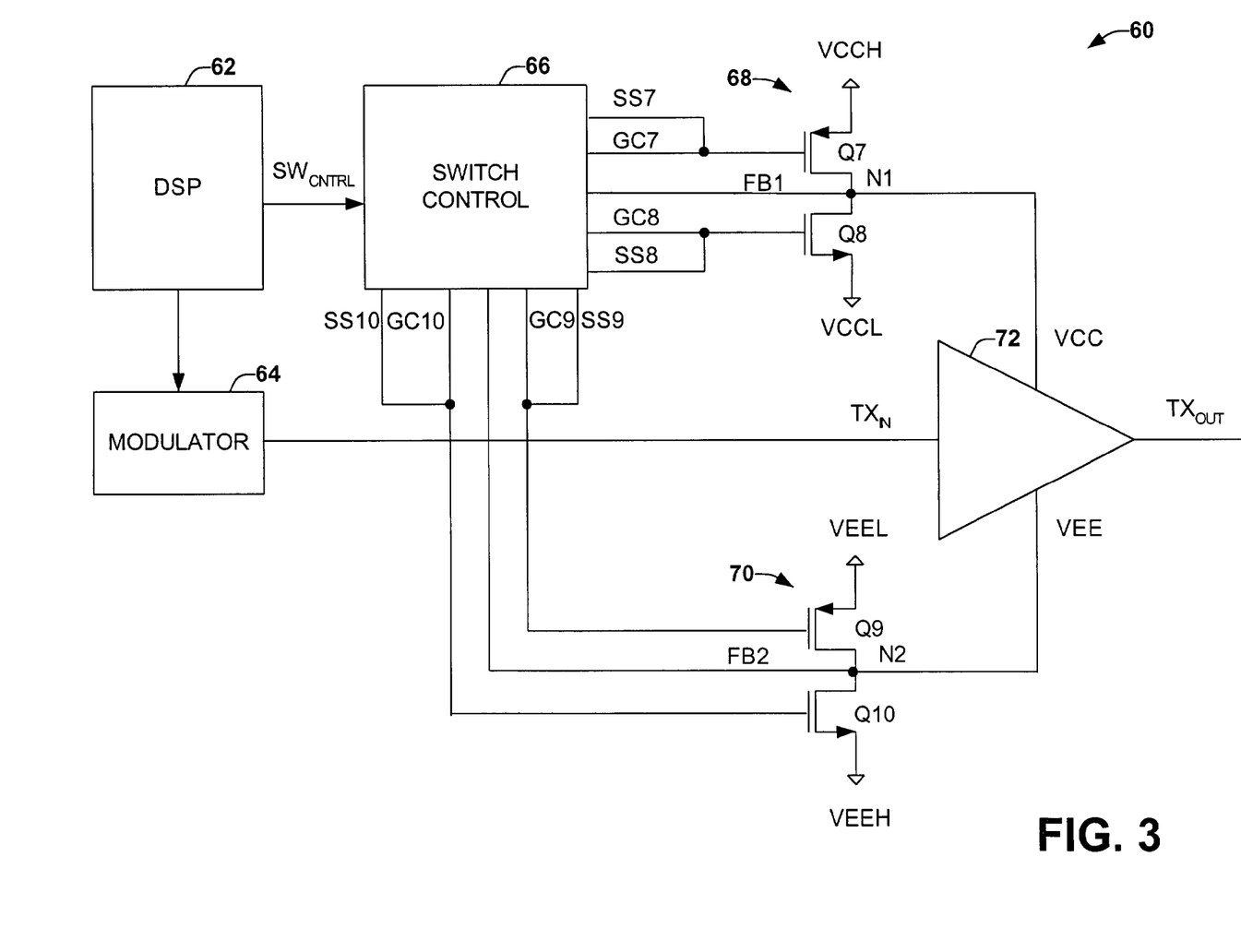
FIG. 3 illustrates a schematic block diagram of a system for transmitting ADSL data from a central office in accordance with an aspect of the present invention.

FIG. 3 illustrates a system 60 for transmitting ADSL data from a central office in accordance with an aspect of the present invention. The system 60 includes a positive side MOSFET pair 68 coupled to a positive side power rail (VCC) of a differential driver 72, and a negative side MOSFET pair 70 coupled to a negative side power rail (VEE) of the differential driver 72. The positive side MOSFET pair 68 includes a p-type MOSFET device Q7 and an n-type MOSFET device Q8 coupled common drain. The p-type MOSFET device Q7 has its source coupled to a high voltage power supply VCCH, and the n-type MOSFET device Q8 has its source coupled to a low voltage power supply VCCL. The negative side MOSFET pair 70 also includes a p-type MOSFET device Q9 and an n-type MOSFET device Q10 coupled common drain. The p-type MOSFET device Q9 has its source coupled to a low voltage power supply VEEL, and the n-type MOSFET device Q10 has its source coupled to a high voltage power supply VEEH. A switch control device 66 switches the MOSFET transistors between providing high supply voltages VCCH to the positive side power rail (VCC) and VEEH to the negative side power rail VEE of the differential driver 72, and low supply voltages VCCL to the positive side power rail (VCC) and VEEL to the negative side power rail VEE of the differential driver 72.

A first steady state control line (SS7) is coupled to the gate input of the p-type MOSFET device Q7 along with a first gate control signal (GC7), while a second steady state control line (SS8) is coupled to the gate input of the n-type device Q8 along with a second gate control signal (GC8). A third steady state control line (SS9) is coupled to the gate input of the p-type MOSFET device Q9 along with a third gate control signal (GC9), while a fourth steady state control line (SS10) is coupled to the gate input of the n-type device Q10 along with a fourth gate control signal (GC10). A first feedback signal (FB1) is coupled to node N1, while a second feedback signal (FB2) is coupled to a node N2. During a transition between low power supply and high power supply voltages to the differential driver 72, the respective voltages at node N1 and N2 are ramped up over a controlled amount of time from low power supply voltages to high power supply voltages, or ramped down over a controlled amount of time from high power supply voltages to low power supply voltages to mitigate large voltage spikes being coupled to the output signal $TX_{OUT}$.

After the transition has occurred between providing low power supply and high power supply voltages to the differential driver 72, the system 60 enters a steady state mode in which respective steady state signals hold the transistors Q7–Q10 in the current state. The switch control device 66 then enters a suspend or low power sleep state. A digital signal processor (DSP) 62 provides downstream data to a modulator 64. The modulator 64 converts the digital data to analog data and modulates the data into tones or carriers. The data from the modulator 64 is transmitted to the input $TX_{IN}$ of the downstream driver 72. The DSP 62 determines when a transition between a general RMS voltage amplitude level and a high spike peak voltage amplitude level occurs, and transmits a switch control signal $SW_{CNTRL}$ to the switch control device 66. The switch control device 66 then wakes up or exits the suspend mode, and changes the state of the transistors Q7–Q10 to opposite states employing a ramp function which is monitored by the feedback signals FB1 and FB2 from nodes N1 and N2, respectively. The steady state signals hold the system 60 in the new transition state and then enters a suspend mode, while data from the DSP is transmitted through the differential driver 72. This process is repeated each time a transition of the input signal from a general RMS amplitude voltage level and a high spike peak amplitude voltage level occurs, and a transition from a high spike peak amplitude voltage level and a general RMS amplitude voltage level occurs.

Figure 4:
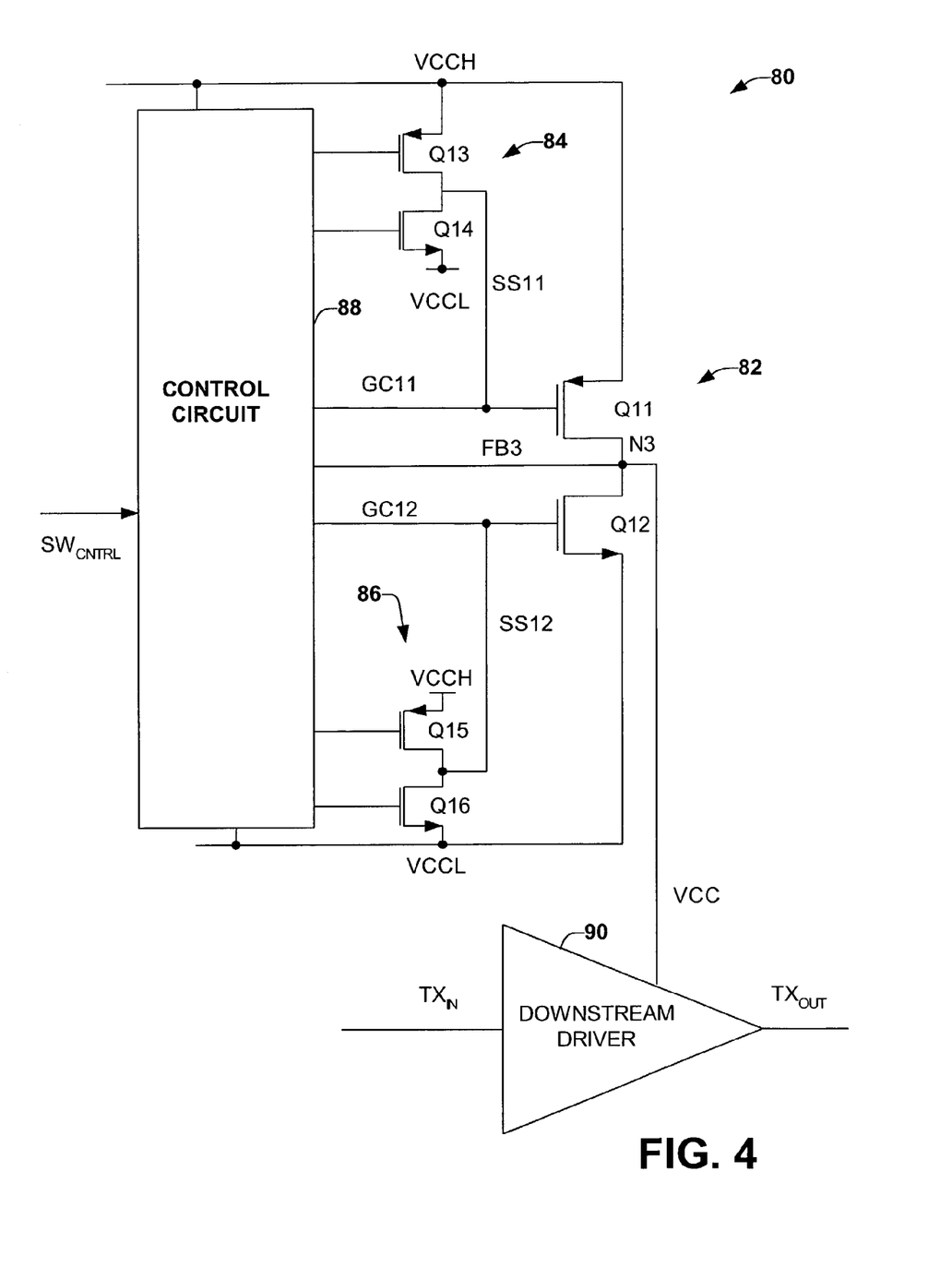
FIG. 4 illustrates a schematic block diagram of a positive side portion of a class G amplifier employing inverter devices in accordance with an aspect of the present invention.

FIG. 4 illustrates a positive side portion of a MOSFET class G amplifier 80 employing inverter devices to control the MOSFET class G switch 80 in a steady state condition in accordance with an aspect of the present invention. The positive side portion of the MOSFET class G amplifier is provided for illustrative purposes. It is to be appreciated that a similar arrangement can be provided of the negative side portion of the MOSFET class G amplifier 80. A positive side MOSFET pair 82 is coupled to a positive side power rail (VCC) of a differential driver 90. The positive side MOSFET pair 82 includes a p-type MOSFET Q11 and an n-type MOSFET Q12 coupled common drain. The p-type MOSFET Q11 has its source coupled to a high voltage power supply VCCH and the n-type MOSFET Q12 has its source coupled to a low voltage power supply VCCL.

A first switch pair 84 is coupled to the gate of the p-type transistor Q11 and a second switch pair 86 is coupled to the gate of the n-type MOSFET device Q12. The first switch pair 84 includes a p-type MOSFET Q13 and an n-type MOSFET Q14 coupled common drain. The p-type MOSFET Q13 has its source coupled to the high voltage power supply VCCH and the n-type MOSFET Q14 has its source coupled to a low voltage power supply VCCL. The second switch pair 86 includes a p-type MOSFET Q15 and an n-type MOSFET Q16 coupled common drain. The p-type MOSFET Q15 has its source coupled to the high voltage power supply VCCH and the n-type MOSFET Q16 has its source coupled to a low voltage power supply VCCL. The first switch pair 84 and second switch pair 86 control the steady gate condition of the class G power amplifier 80.

A control circuit 88 is provided that controls the switching of the transistors Q11–Q16. A switch control signal $SW_{CNTRL}$ is provided to the control circuit 88 from, for example, a DSP. The state of the switch control signal $SW_{CNTRL}$ determines whether the high supply voltage or the low supply voltage is to be provided to the positive side power rail (VCC) of the downstream driver 90. For example, if a switch control signal $SW_{CNTRL}$ is received that indicates that the ADSL input signal will have a high spike peak voltage amplitude level, the control circuitry turns MOSFET device Q11 and Q12 to an "ON" state. The control circuit 88 turns off transistors Q13–Q16 and slowly increases the voltage on node N3, until it reaches VCCH, while monitoring the gate voltage GC11. Once the voltage on N3 reaches VCCH, the MOSFET device Q11 will move from a saturation mode to a linear mode causing the gate voltage of GC11 to ramp down to the opposite rail voltage VCCL. The control circuit 88 detects the transition of the gate voltage GC11 indicating that the supply voltage VCC has reached its desired level. The control circuit 88 then turns Q14 and Q16 to an "ON" state and Q13 and Q15 to an "OFF" state holding the input gate voltage GC11 of Q11 to VCCL and the input gate voltage of Q12 to VCCL. The control circuit 88 then enters a suspend or sleep mode.

After a period of time, the switch control signal $SW_{CNTRL}$ indicates that the input signal $TX_{IN}$ will return to the general RMS amplitude level. The control circuit 88 turns MOSFET devices Q11 and Q12 to an "ON" state. The control circuit 88 turns off transistors Q13–Q16 and slowly decreases the voltage on node N3, until it reaches VCCL, while monitoring the gate voltage GC12. Once the voltage on N3 reaches VCCL, the MOSFET device Q12 will move from a saturation mode to a linear mode causing the gate voltage of GC12 to ramp to the opposite rail voltage VCCH. The control circuit 88 detects the transition of the gate voltage GC12 indicating that the supply voltage VCC has reached its desired level. The control circuit 88 then turns Q13 and Q15 to an "ON" state and Q14 and Q16 to an "OFF" state holding the input gate voltage of Q11 to VCCH and the input gate voltage of Q12 to VCCH. The control circuit then enters a suspend or sleep mode. This process is repeated again when a high spike peak voltage amplitude level is detected.

Figure 5:
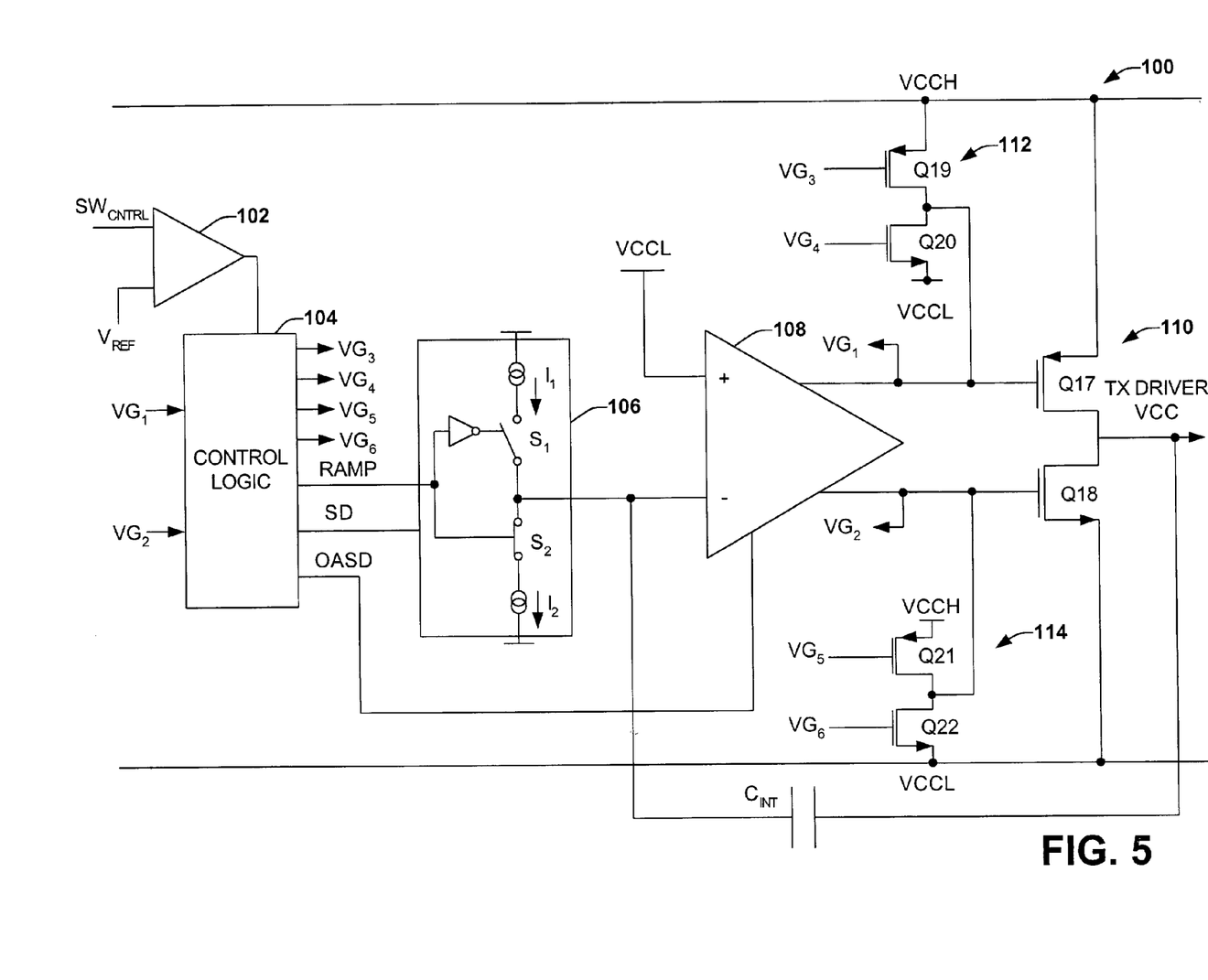
FIG. 5 illustrates a schematic block diagram of a control system for switching a positive side of a differential driver between a low voltage supply and a high voltage supply in accordance with an aspect of the present invention.

FIG. 5 illustrates a control system 100 for switching a positive side of a differential driver between a low voltage supply VCCL and a high voltage supply VCCH. The circuitry for providing a supply voltage to the positive side portion of the differential driver is provided for illustrative purposes. It is to be appreciated that a similar arrangement can provide a supply voltage to the negative side portion of the differential driver. The control system 100 includes a comparator 102 that receives a switch control signal $SW_{CNTRL}$ from a DSP indicating whether an ADSL signal has a general RMS voltage amplitude level or whether a large spike peak voltage amplitude level is in the input signal. The comparator 102 compares the switch control signal $SW_{CNTRL}$ with a reference signal ($V_{REF}$) to determine whether the input signal is in a high voltage state or a low voltage state. The output of the comparator 102 is provided to a control logic device 104 which provides the comparator output to a bidirectional current source device 106 via a RAMP signal. The RAMP signal controls the state of a first switch S1 and a second switch S2. The RAMP signal is connected to the first switch S1 through an inverter, while the RAMP signal is connected directly to the second switch S2, such that the first and second switches are "OPEN" or "CLOSED" in opposing states. The first switch S1 switches in a first current source I1 to an output of the bidirectional current source 106 and the second switch S2 switches in a second current source I2 to the output of the bidirectional current source 106.

The output of the bidirectional current source 106 is coupled to an operational amplifier 108 and one side of a capacitor $C_{INT}$. The operational amplifier 108 and the capacitor $C_{INT}$ form an integrator that ramps a positive side power supply rail output from low voltage supply VCCL to high voltage supply VCCH, or ramps the high power supply rail output from high voltage supply VCCH to low voltage supply VCCL based on the state of the bidirectional current source 106. A positive side MOSFET pair 110 is coupled to a positive side power rail VCC of a differential driver (not shown). The positive side MOSFET pair 110 includes a p-type MOSFET Q17 and an n-type MOSFET Q18 coupled common drain. The p-type MOSFET Q17 has its source coupled to a high voltage power supply VCCH and the n-type MOSFET Q18 has its source coupled to a low voltage power supply VCCL. It should be appreciated that the p-type MOSFET Q17 and the n-type MOSFET Q18 form the output stage of the operational amplifier 108 and the gate drive controls are internal operational amplifier nodes. The gate voltage $VG_1$ of the MOSFET device Q17 and the gate voltage $VG_2$ of the MOSFET device Q18 are fed back to the control logic device 104. The MOSFET devices Q17 and Q18 operate as output transistors of the operational amplifier 108 during switching events, and as low "ON" resistance switches in the suspend mode.

A first steady state switch pair 112 is coupled to the gate of the p-type transistor Q17 and a second steady state switch pair 114 is coupled to the n-type MOSFET device Q18. The first switch pair 112 includes a p-type device MOSFET device Q19 and an n-type MOSFET device Q20 coupled common drain. The p-type MOSFET device Q19 has its source coupled to the high voltage power supply VCCH and the n-type MOSFET device Q20 has its source coupled to a low voltage power supply VCCL. The second switch pair 114 includes a p-type MOSFET device Q21 and an n-type MOSFET device Q22 coupled common drain. The p-type MOSFET device Q21 has its source coupled to the high voltage power supply VCCH and the n-type MOSFET device Q22 has its source coupled to a low voltage power supply VCCL. The first switch pair 112 and the second switch pair 114 control the steady gate condition of the positive side MOSFET pair 110 once the output supply voltage reaches a desired voltage supply state.

If the comparator 102 determines that a transition between a general RMS voltage amplitude level to a large spike peak voltage amplitude level is to occur, the RAMP signal closes S2 and opens S1, causing the current from the current source I2 to be drawn from the capacitor $C_{INT}$. Since the voltage at inverting input of the operational amplifier 108 desires to remain at the voltage of the non-inverting input (VCCL), the voltage at the output (TX DRIVER VCC) is ramped up from VCCL to VCCH based on a ramp rate determined by $C_{INT}$ and the current source I2. Both MOSFET device Q17 and Q18 are in the saturation mode during the ramping of the output supply voltage. Therefore, the voltage gain of the MOSFET devices Q17 and Q18 are very large during the ramping of the output supply voltage. When the output supply voltage reaches the desired supply voltage VCCH, the MOSFET device Q17 begins entering the linear mode ramping down the input gate signal voltage $VG_1$. The input gate signal voltage $VG_1$ is overdriven to overdrive the MOSFET device Q17, so that the "ON" state resistance of the MOSFET device Q17 is very low.

The control logic device 104 monitors the gate input signal $VG_1$ to determine when the output supply voltage has reached the desired high supply voltage VCCH and that Q17 is being overdriven. The control logic device 104 then transmits gate signals $VG_3$, $VG_4$, $VG_5$ and $VG_6$, which holds MOSFET devices Q20 and Q22 in an "ON" state and holds MOSFET device Q19 and Q21 in an "OFF" state. This holds the MOSFET device Q17 in an "ON" state, and Q18 in an "OFF" state. The control logic device 102 then sends a shutdown signal (SD) to the bidirectional current source 106, and a shutdown signal (OASD) to the operational amplifier 108. The bidirectional current source 106 and the operational amplifier 108 then enter a suspend or low current state.

If the comparator 102 determines that a transition between a large spike peak value to a general RMS amplitude value to is to occur, the ramp signal closes S1 and opens S2, causing the current from the current source I1 to be driven into the capacitor $C_{INT}$. Since the voltage at inverting input of the operational amplifier 108 desires to remain at the voltage of the non-inverting input VCCL, the voltage at the output (TX Driver VCC) is ramped down from VCCH to VCCL based on a ramp rate determined by the values of $C_{INT}$ and the current source I1. The MOSFET devices Q17 and Q18 are in the saturation mode during the ramping of the output supply voltage. Therefore, the voltage gain of the MOSFET devices Q17 and Q18 are very large during the ramping of the output supply voltage. When the output supply voltage reaches the desired supply voltage VCCL, the MOSFET device Q18 begins entering the linear mode ramping up the input gate signal voltage $VG_2$. The input gate signal voltage $VG_2$ is overdriven to overdrive the MOSFET device Q18, so that the "ON" state resistance of the MOSFET device Q18 is very low.

The control logic device 104 monitors the gate input signal $VG_2$ to determine when the output supply voltage (TX Driver VCC) has reached the desired low supply voltage VCCL and that Q18 is being overdriven. The control logic device 104 then transmits gate signals $VG_3$, $VG_4$, $VG_5$ and $VG_6$, which holds MOSFET device Q19 and Q21 in an "ON" state and holds MOSFET device Q20 and Q22 in an "OFF" state. This holds the MOSFET device Q18 in an "ON" state, and Q17 in an "OFF" state. The control logic device 104 then sends a shutdown signal (SD) to the bidirectional current source 106, and a shutdown signal (OASD) to the operational amplifier 108. The bidirectional current source 106 and the operational amplifier 108 then enter a suspend or low current state.

It is to be appreciated that a similar control system 100 can be provided for switching the negative side power rail of the differential driver between a high voltage supply state and a low voltage supply state. Furthermore, it is to be appreciated that a variety of other mechanisms to provide the desired voltage ramp supply signal and desired steady state condition.

Figure 6:
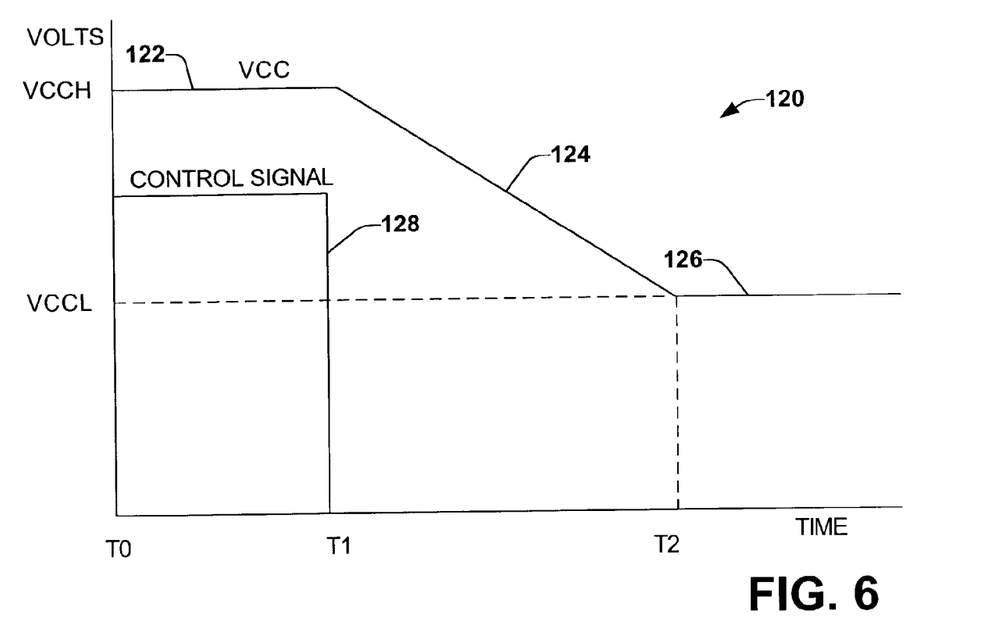
FIG. 6 illustrates a graph of voltage versus time of an input control signal and output supply voltage for ramping down from a high supply voltage to a low supply voltage for a differential driver in accordance with an aspect of the present invention.
Figure 7:
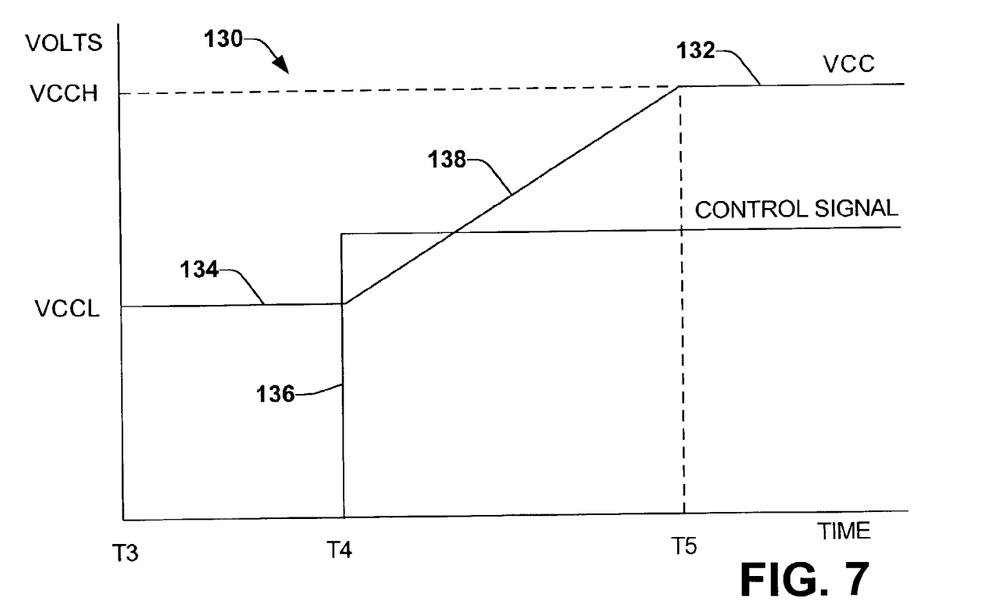
FIG. 7 illustrates a graph of voltage versus time of an input control signal and output supply voltage for ramping up from a low supply voltage to a high supply voltage for a differential driver in accordance with an aspect of the present invention.

FIG. 6 illustrates a graph 120 of voltage versus time of an input control signal and output supply voltage for ramping down from a high supply voltage VCCH to a low supply voltage VCCL for a class G power amplifier. The class G power amplifier provides a positive side power rail supply voltage VCC at a high voltage supply VCCH during a steady state condition 122 beginning at a time T0. The class G power amplifier detects a transition of a control signal 128 at time T1, and begins ramping the supply voltage down from VCCH to VCCL during a ramp period 124 between T1 and T2, as illustrated in the graph 120. After time period T2, the class G power amplifier resumes a steady state condition 126 at the low power supply voltage VCCL. FIG. 7 illustrates a graph 130 of voltage versus time of an input control signal and output supply voltage for ramping up from a low supply voltage VCCL to a high supply voltage VCCH for a class G power amplifier. The class G power amplifier provides a positive side power rail supply voltage VCC at a low voltage supply VCCL during a steady state condition 134 beginning at T3. The class G power amplifier detects a transition of a control signal 136 at time T4, and begins ramping the supply voltage up from VCCL to VCCH during a ramp period 138 between T4 and T5, as illustrated in the graph 130. After time period T5, the class G power amplifier resumes a steady state condition 132 at the high power supply voltage VCCH.

Figure 8:
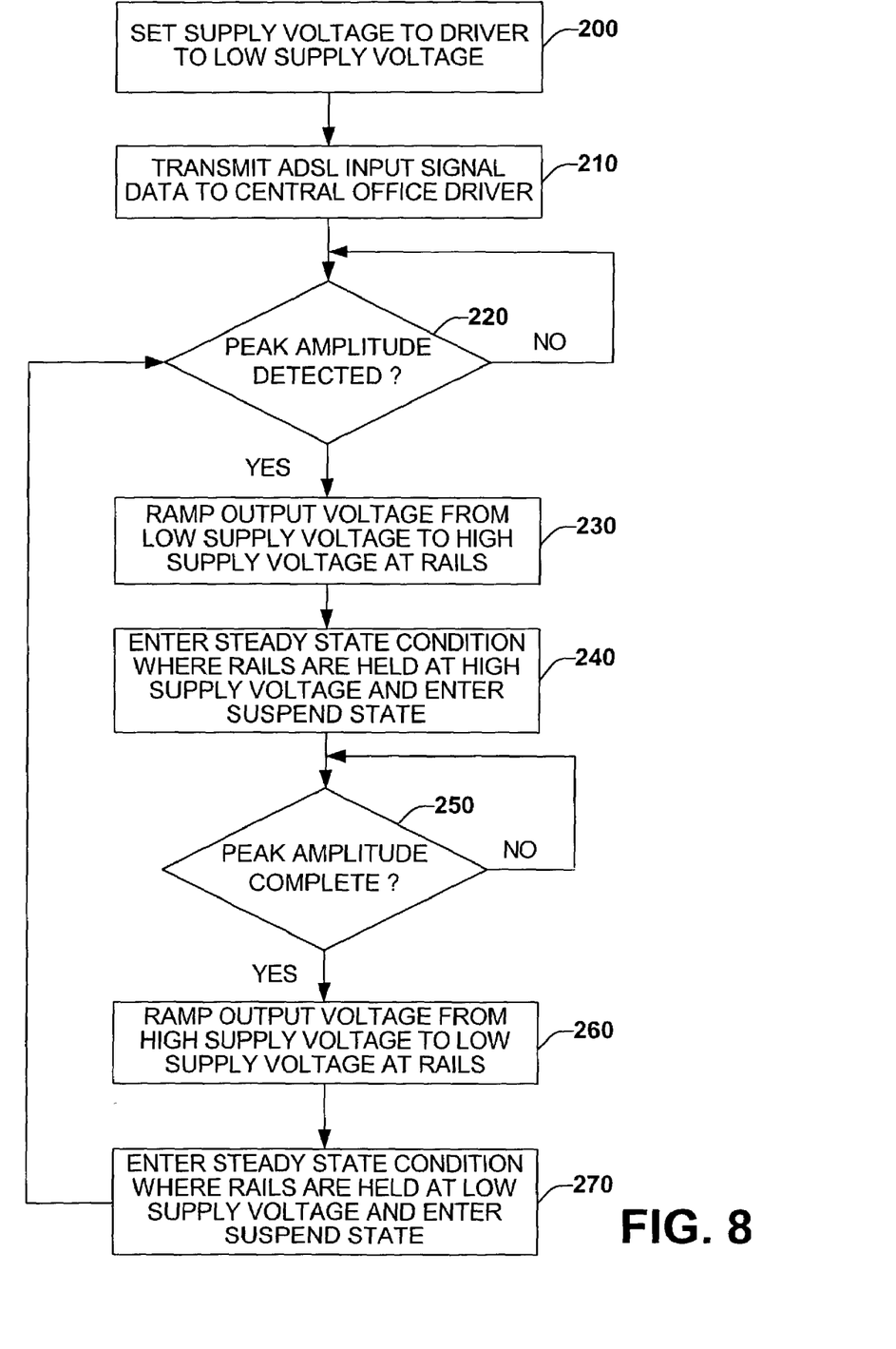
FIG. 8 illustrates a methodology for switching between supply voltages for providing power to a class G amplifier in accordance with an aspect of the present invention.
Figure 9:
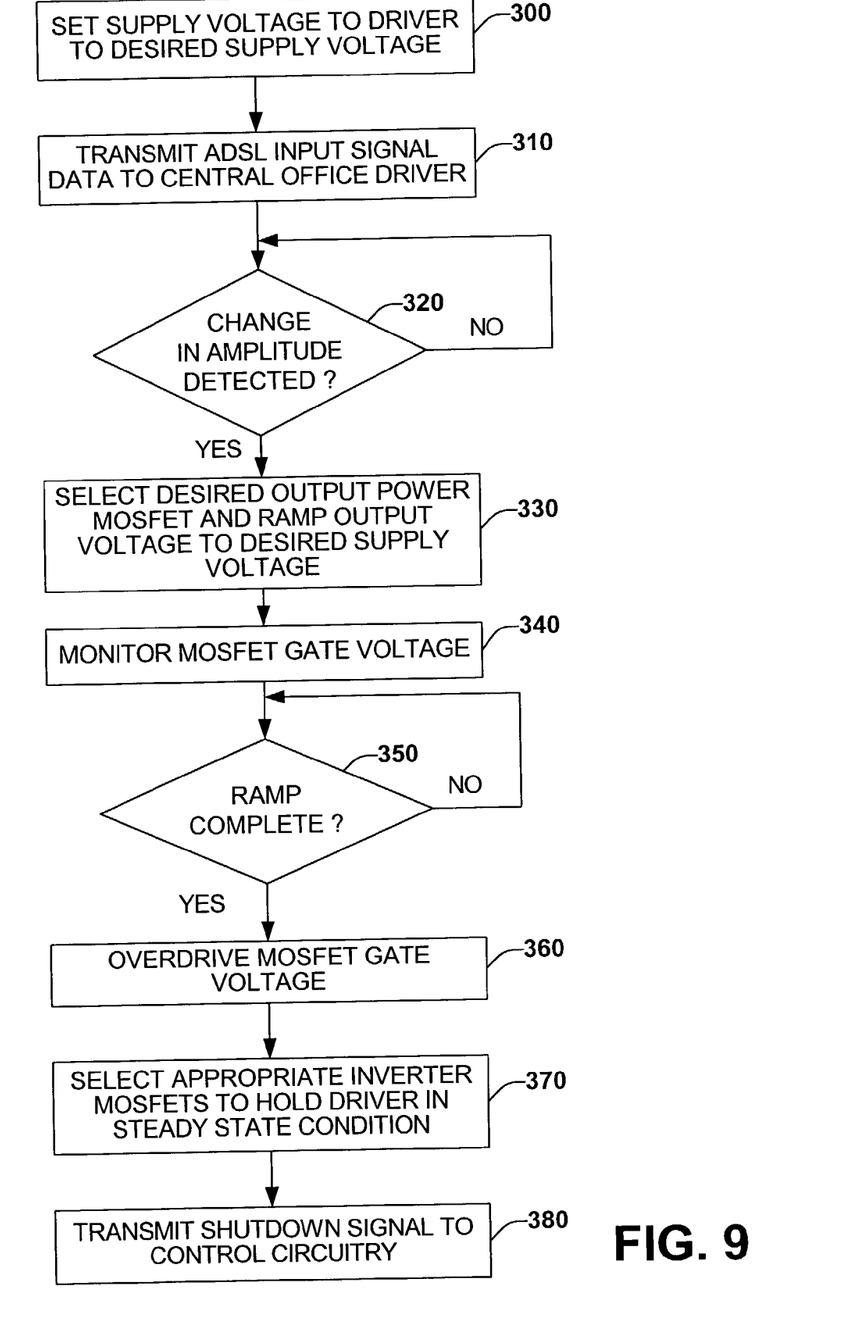
FIG. 9 illustrates a methodology for operating a control system that switches between supply voltages for providing power to a differential driver employed in class G amplifier in accordance with an aspect of the present invention.

In view of the foregoing structural and functional features described above, methodologies in accordance with various aspects of the present invention will be better appreciated with reference to FIGS. 8–9. While, for purposes of simplicity of explanation, the methodologies of FIGS. 8–9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates one particular methodology for switching between supply voltages for providing power to a class G power amplifier employed in an ADSL central office in accordance with an aspect of the present invention. The methodology begins at 200 where the supply voltage to a differential driver is set to a low supply voltage. ADSL input signal data is then transmitted from through a central office driver. The methodology then proceeds to 220 to monitor whether or not a peak amplitude level voltage has been detected. If a peak amplitude level voltage has been not been detected (NO), the methodology repeats 220. If a peak voltage amplitude level has been detected (YES), the methodology proceeds to 230. At 230, the supply voltage at the power rails of the differential driver are ramped from the low supply voltage level to a high supply voltage level. The class G power amplifier then enters a steady state condition where the rails are held at the high supply voltage level at 240. The class G power amplifier then enters a low power or suspend mode.

The methodology then proceeds to 250 to determine if the peak voltage amplitude level of the ADSL signal has completed. If the peak voltage amplitude level of the ADSL signal has not completed (NO), the methodology repeats 250. If the peak voltage amplitude level of the ADSL signal has completed (YES), the methodology advances to 260. At 260, the supply voltage at the power rails of the differential driver are ramped from the high supply voltage level to the low supply voltage level. The class G power amplifier then enters a steady state condition where the rails are held at the low supply voltage level at 270. The class G power amplifier then enters a low power or suspend mode. The methodology then returns to 220 to monitor for the detection of a peak voltage amplitude level in the ADSL input signal.

FIG. 9 illustrates one particular methodology for operating a control system that switches between supply voltages for providing power to a differential driver employed in an ADSL central office in accordance with an aspect of the present invention. The methodology begins at 300 where the supply voltage to a differential driver is set to a desired supply voltage. At 310, an ADSL input signal is then transmitted from the central office driver. The methodology then proceeds to 320 to monitor whether or not a change in voltage amplitude level has been detected in the ADSL signal. If a change in voltage amplitude level has not been detected (NO), the methodology repeats 320. If a change in voltage amplitude level has been detected (YES), the methodology proceeds to 330. At 330, the desired output power MOSFETs are selected for both the positive supply rail and the negative supply rail of the differential driver, and the output power supply voltages are ramped to the desired supply voltage levels. At 340, the gates of the output power MOSFETs are monitored to determine if the desired supply voltage levels and gate overdrive conditions have been achieved for both the negative side and positive side power rails. The methodology then proceeds to 350.

At 350, the methodology determines if the ramping has completed. If the ramping has not completed (NO), the methodology repeats 350. If the ramping has completed (YES), the methodology proceeds to 360. At 360, the selected MOSFET gate voltages are overdriven to minimize the "ON" state resistance of the power MOSFETs. At 370, the appropriate inverter MOSFET devices are selected to hold the power MOSFETs and the differential driver in a steady state condition. The methodology then proceeds to 380. At 380, a shutdown signal is transmitted that causes the control circuitry to enter a suspend or sleep mode.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A class G amplifier comprising:
   a differential driver device having a positive side supply rail and a negative side supply rail;
   positive side and negative side switch circuits, each having an output and each comprises first, second, and third switch pairs, each switch pair coupled between a high supply voltage and a low supply voltage: each switch pair having first and second gate control nodes and an output node: the output node of the first switch pair couples to the first gate control node of the third switch pair: the output node of the second switch pair couples to the second gate control node of the third switch pair: and the output node of the third switch couples to the output of the corresponding positive side or negative side switch circuits:
   each positive side and negative side switch circuit further comprises a control circuit, coupled to each gate control node of the first, second and third switch pairs: and
   the output of the positive side switch circuit couples to the positive side supply rail of the differential driver and the output of the negative side switch circuit couples to the negative side supply rail of the differential driver: whereby the positive and negative side supply rails couple to a target supply voltage and the voltage is maintained.

2. The class G amplifier of claim 1, wherein each switch pair comprises a p-type MOSFET and an n-type MOSFET; each MOSFET having a gate, a drain, and a source; for each switch pair, the drain of the p-type MOSFET couples to the drain of the n-type MOSFET and also couples to the output node of the switch pair; and for each switch pair, the source of the p-type MOSFET couples to the high supply voltage, and the source of the n-type MOSFET couples to the low supply voltage.

3. The class G amplifier of claim 1, wherein each control circuit comprises a comparator having an output and a logic unit having logic outputs; the output of the comparator couples to the logic unit; and the logic outputs couple to respective control gate nodes of the first and second switch pairs.

4. The class G amplifier of claim 3, wherein the input signal comprises an ADSL input signal and the class G amplifier is a central office downstream driver.

5. The class G amplifier of claim 3, wherein the control circuit further comprises an integrator circuit having inputs and outputs; the inputs couple to the logic outputs and the outputs of the integrator circuit couple to the corresponding third switch pair; whereby the positive side and negative side switch circuits smoothly transition between the respective high supply voltage and the respective low supply voltage via a ramped voltage from the integrator circuit.

6. The class G amplifier of claim 5, wherein the control circuit is adapted and configured to provide steady state control signals to the first and second switch pairs to hold the positive side and negative side switch circuits in a new supply voltage state after a transition between states.

7. The class G amplifier of claim 6, wherein the control circuit is operative to enter a suspend state after a transition between states.

8. The class G amplifier of claim 7, wherein the control circuit is operative to exit the suspend state in response to a transition of a control signal.

9. The class G amplifier of claim 1, wherein the control circuit is operative to ramp at least one of the positive side supply rail or the negative side supply rail over time between its corresponding high supply voltage and low supply voltage; and the first and second switch pairs are opperative to hold the positive side and negative side switch circuits in a new supply voltage state after a transition between states; whereby a smooth transition between supply voltages is achieved and then the state is maintained.

10. A driver system for transmitting ADSL data from a central office, the system comprising:
- a differential driver device having a positive side supply rail and a negative side supply rail;
- positive and negative side switch circuits for switching at least one of the respective positive side supply rail or the negative side supply rail between corresponding high supply and low supply voltages;
- each of the positive and negative side switch circuits comprising a comparator, a logic unit, a switch pair circuit, and an integrator;
- the comparator for selecting the high supply or the low supply voltage responsive to a magnitude of the ADSL data;
- the logic unit for generating bits to control the switch pair circuit and integrator, the logic unit responsive to the comparator;
- the integrator for providing a ramped voltage;
- the switch pair circuit for switching the respective high supply or low supply voltage to the corresponding positive side or negative side supply rails of the differential driver device over time with the ramped voltage; and
- the switch pair circuit comprising first, second, third switch pairs, each coupled between the high supply and low supply voltages; the first and second switch pairs for driving the third switch pair after end points of the ramped voltage are reached, the third switch pair for switching the high supply or the low supply voltage.

11. The driver system of claim 10, wherein each integrator is further for controlling the ramp rate of the switching between the high supply voltage and the low supply voltage; each integrator comprises an amplifier and a feedback capacitor, the amplifier further for driving inputs of the third switch pair, the feedback capacitor coupling between a voltage output of the third switch pair and an input of the amplifier.

12. The driver system of claim 11, wherein the amplifier is adapted and configured to be turned off after the switching is complete.

13. The driver system of claim 11, wherein each integrator further comprises a bidirectional current source coupled to the input of the amplifier, the bidirectional current source comprising a first selectable current source that cooperates with the feedback capacitor to ramp down the voltage output of the third switch pair from the high supply voltage to the low supply voltage and a second selectable current source that cooperates with the feedback capacitor to ramp up the voltage output of the third switch pair from the low supply voltage to the high supply voltage.

14. The driver system of claim 13, wherein each logic unit is adapted to switches between selecting the first current source during ramping down the voltage output and selecting the second current source during ramping up of the supply voltage output based on a state of a control signal.

15. The driver system of claim 14, wherein each switch pair comprises MOSFETs; each logic unit monitors at least one gate voltage of a MOSFET of a switch pair in the switch pair circuit during ramping of the voltage output to determine the completion of the voltage output transition, each logic unit transmits a power down signal to at least one of the bidirectional current source and the amplifier upon detecting completion of the voltage output transition.

16. A method for switching between power supplies for providing power to a class G amplifier having a differential driver, the method comprising:
- setting at least one supply voltage of the differential driver to a first supply voltage using switching transistors;
- transmitting a data signal through the class G amplifier;
- monitoring for a transition of a control signal associated with a change in voltage amplitude level of the data signal;
- ramping the supply voltage from the first supply voltage to a second supply voltage in response to a transition of the control signal;
- detecting a change in the switching transistors' region of operation indicative of reaching an end to the ramping;
- entering a steady state condition to hold the supply voltage to the second supply voltage; and
- entering a suspend state after entering a steady state condition until a new transition of the control signal is detected.

17. The method of claim 16, further comprising repeating the monitoring for a transition of the control signal and ramping the supply voltage from the second supply voltage to the first supply voltage in response to a transition in the control signal.

18. The method of claim 16, the first supply voltage and the second supply voltage being provided by a positive side MOSFET switch pair coupled to a positive side supply rail of the differential driver and a negative side MOSFET switch pair coupled to a negative side supply rail of the differential driver.

19. The method of claim 18, further comprising overdriving selected MOSFETs from the positive side MOSFET switch pair and the negative side MOSFET switch pair to reduce the "ON" state resistance of the selected MOSFETs.

20. The class G amplifier of claim 5, wherein the integrator circuit comprises a current source circuit, an amplifier input stage and an integrating capacitor; selected logic outputs of the logic unit couple to the current source circuit; the current source circuit couples to the amplifier input stage; the amplifier has outputs coupled to the gate control nodes of the third switch pair; and the integrating capacitor couples between the output of the third switch pair and an input of the amplifier; whereby the third switch pair forms an output stage for the amplifier, and together with the integrating capacitor forms an integrator.

21. A class G amplifier for processing an input signal, the class G amplifier comprising:
- a differential driver having a positive side supply rail and a negative side supply rail;
- positive and negative side switch circuits for switching at least one of the respective positive side supply rail or the negative side supply rail between corresponding high supply and low supply voltages;
- each of the positive and negative side switch circuits comprising a comparator, a logic unit, a switch pair circuit, and an integrator;
- the comparator for selecting the high supply or the low supply voltage responsive to a magnitude of the input signal;
- the logic unit for generating bits to control the switch pair circuit and integrator, the logic unit responsive to the comparator;
- the integrator for providing a ramped voltage;
- the switch pair circuit comprising switch pair transistors for switching the respective high supply or low supply voltage to the corresponding positive side and negative side supply rails of the differential driver device over time with the ramped voltage; and the logic unit for detecting a change in the switch pair transistors' region of operation indicative that endpoints of the ramped voltage are reached.

22. The class G amplifier of claim 21, wherein the input signal comprises an ADSL input signal and the class G amplifier is a central office downstream driver.

23. The class G amplifier of claim 21, wherein the logic unit is further for entering a steady state condition when the endpoints of the ramped voltage are reached, and for entering a suspend state after entering a steady state condition until a new transition of the control signal is detected; whereby the integrator is turned off in the suspend state.

24. The class G amplifier of claim 23, wherein the input signal comprises an ADSL input signal and the class G amplifier is a central office downstream driver.

* * * * *